United States Patent
Schulzki et al.

(10) Patent No.: US 8,459,719 B2
(45) Date of Patent: Jun. 11, 2013

(54) ROOF CONSTRUCTION OF A MOTOR VEHICLE

(75) Inventors: Markus Schulzki, Ludwigsburg (DE); Kurt Pfertner, Friolzheim (DE); Gernot Bruder, Karlsruhe (DE); Metodi Kostadinov, Stuttgart (DE); Christian Soergel, Stuttgart (DE)

(73) Assignees: Dr. Ing. h.c. F. Porsche Aktiengesellschaft, Stuttgart (DE); Magna Car Top Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 13/330,027

(22) Filed: Dec. 19, 2011

(65) Prior Publication Data
US 2012/0153664 A1    Jun. 21, 2012

(30) Foreign Application Priority Data
Dec. 17, 2010   (DE) .......................... 10 2010 055 039

(51) Int. Cl.
  *B60J 7/00*  (2006.01)
(52) U.S. Cl.
  USPC ............ 296/107.08; 296/107.11; 296/107.16; 296/107.17; 280/756
(58) Field of Classification Search
  USPC .............. 296/107.08, 107.09, 107.11, 107.15, 296/107.16, 107.05, 135, 107.17; 280/756
  See application file for complete search history.

(56) References Cited

U.S. PATENT DOCUMENTS

| | | | |
|---|---|---|---|
| 6,508,504 B1 * | 1/2003 | Conradt et al. | 296/136.06 |
| 6,682,124 B1 * | 1/2004 | Bohnke | 296/107.08 |
| 7,172,242 B2 * | 2/2007 | Heselhaus | 296/219 |
| 7,455,347 B2 * | 11/2008 | Heselhaus et al. | 296/107.17 |
| 2005/0088008 A1 * | 4/2005 | Quindt et al. | 296/107.08 |
| 2007/0152468 A1 * | 7/2007 | Cole et al. | 296/107.08 |
| 2011/0291438 A1 * | 12/2011 | Schulz | 296/107.08 |

FOREIGN PATENT DOCUMENTS

| | | |
|---|---|---|
| DE | 3930343 A1 | 3/1991 |
| DE | 10248346 B3 | 1/2004 |
| DE | 102005037911 B3 | 1/2007 |
| DE | 102006052071 A1 | 5/2008 |
| DE | 102008027892 A1 | 12/2009 |
| EP | 0 845 378 B1 | 10/2001 |
| FR | 2878473 A1 | 6/2006 |

* cited by examiner

*Primary Examiner* — Jason S Morrow
*Assistant Examiner* — E Turner Hicks
(74) *Attorney, Agent, or Firm* — RatnerPrestia

(57) ABSTRACT

A roof construction for a motor vehicle has a roll bar and a roof element which, in a closed position, is accommodated between the roll bar and a windshield and, in an open position, is accommodated behind the roll bar and can be shifted from the open position into the closed position and vice versa beyond the roll bar via an opening and closing mechanism. The roof constructing further has a covering which covers the roll bar on the outside in the open position of the roof element and in the closed position of the roof element. Vertical extending side parts of the covering can be shifted relative to the roll bar during the shifting of the roof element. A transverse part of the covering extends substantially in a horizontal direction and is fastened to the roll bar so as not to be able to be shifted relative thereto.

9 Claims, 4 Drawing Sheets

ROOF CONSTRUCTION OF A MOTOR VEHICLE

CROSS-REFERENCE TO RELATED APPLICATION

This application claims the priority, under 35 U.S.C. §119, of German application DE 10 2010 055 039.6, filed Dec. 17, 2010; the prior application is herewith incorporated by reference in its entirety.

BACKGROUND OF THE INVENTION

Field of the Invention

The invention relates to a roof construction of a motor vehicle.

European patent EP 0 845 378 B1 discloses a roof construction of a motor vehicle with a fixed roll bar. The roof construction furthermore has a roof part which, in a closed position, is positioned between the roll bar and an upper cowl of a windshield above front seats of the motor vehicle, and which, in an open position, is positioned behind the roll bar in a convertible-top compartment. The convertible-top compartment, which receives the roof element in the open position, is closed by a convertible-top compartment cover both in the open position and in the closed position. The roof element can be shifted from the open position into the closed position and vice versa from the closed position into the open position beyond the fixed roll bar via an opening and closing mechanism which, according to this prior art, is formed by a plurality of links.

It is furthermore known from European patent EP 0 845 378 B1 that the links of the opening and closing mechanism extend beyond the roll bar in the closed position of the roof element. Corresponding cutouts or recesses in the roll bar, through which the links of the opening and closing mechanism extend when the roof element is closed, are covered on the outside both in the open position and in the closed position of the roof element by a covering of the roll bar. According to European patent EP 0 845 378 B1, a section of the covering, which section extends substantially in the horizontal direction, a "transverse part", which covers the roll bar on the outside in the region of a transverse strut both in the closed position of the roof element and in the open position thereof is assigned to the convertible-top compartment cover and can be shifted together with the convertible-top compartment cover relative to the roll bar during the transfer of the roof element from the open position into the closed position and vice versa from the closed position into the open position.

SUMMARY OF THE INVENTION

It is accordingly an object of the invention to provide a roof construction of a motor vehicle which overcomes the above-mentioned disadvantages of the prior art devices of this general type, which has a simple roof construction.

With the foregoing and other objects in view there is provided, in accordance with the invention a roof construction of a motor vehicle having an upper cowl of a windshield and a convertible-top compartment. The roof construction contains a fixed roll bar, an opening and closing mechanism, and a roof element which, in a closed position, is accommodated in front of the fixed roll bar, namely between the fixed roll bar and the upper cowl of the windshield, and, in an open position, is accommodated behind the fixed roll bar in the convertible-top compartment and which can be shifted from the open position into the closed position and vice versa from the closed position into the open position beyond the fixed roll bar via the opening and closing mechanism. The roof construction further having a covering with a transverse part and side parts for covering the fixed roll bar on an outside in the open position of the roof element and in the closed position of the roof element. The side parts of the covering extend substantially in a vertical direction, and can be shifted at least partially, or at least in sections, relative to the fixed roll bar during a shifting of the roof element from the open position into the closed position and vice versa from the closed position into the open position. The transverse part of the covering extends generally in a horizontal direction, and is fastened to the fixed roll bar so as not to be able to be shifted relative thereto.

According to the invention, side parts of the covering, the side parts extending substantially in the vertical direction, can be shifted at least partially, relative to the roll bar during the shifting of the roof element from the open position into the closed position and vice versa from the closed position into the open position, whereas a transverse part of the covering, which transverse part extends generally in the horizontal direction, is fastened to the roll bar so as not to be able to be shifted relative thereto.

In the case of the roof construction according to the invention, side parts of the covering, the side parts extending substantially in the vertical direction, can be shifted at least partially relative to the roll bar, namely during the shifting of the roof element of the roof construction from the open position into the closed position and vice versa from the closed position into the open position. In this case, the transverse part of the covering, which transverse part extends substantially in the horizontal direction, is fitted fixedly to the roll bar and cannot be shifted relative to the roll bar.

According to a first advantageous development of the invention, the side parts of the covering can be shifted completely, including curved transition sections thereof to the transverse part of the covering, relative to the roll bar during the shifting of the roof element from the open position into the closed position and vice versa from the closed position into the open position.

According to a first advantageous development of the invention, the side parts of the covering of the roll bar can be shifted completely relative to the roll bar during the shifting of the roof element from the open position into the closed position and vice versa from the closed position into the open position. This results in a three-part division of the outer covering of the roll bar, namely into the fixed transverse part and the shiftable side parts.

According to a second advantageous development of the invention, exclusively curved transition sections of the side parts to the transverse part of the covering can be shifted relative to the roll bar during the shifting of the roof element from the open position into the closed position and vice versa from the closed position into the open position.

According to the second advantageous development of the invention, the side parts of the covering can be shifted only partially relative to the roll bar, namely during the transfer of the roof element from the closed position into the open position and vice versa from the open position into the closed position, wherein curved transition sections of the side parts, which define a transition of the side parts of the covering to the transverse part, can be shifted. This development of the invention results in a five-part division of the covering of the roll bar, namely into two fixed sections of the side parts, a fixed transverse part and two shiftable sections of the side parts, wherein the shiftable sections of the side parts are the curved transition sections of the side parts.

Other features which are considered as characteristic for the invention are set forth in the appended claims.

Although the invention is illustrated and described herein as embodied in a roof construction of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

The invention relates to a roof construction 10 of a motor vehicle.

Preferred exemplary embodiments of the roof construction 10 according to the invention are described in detail with reference to FIGS. 1 to 5b.

Figure 1:
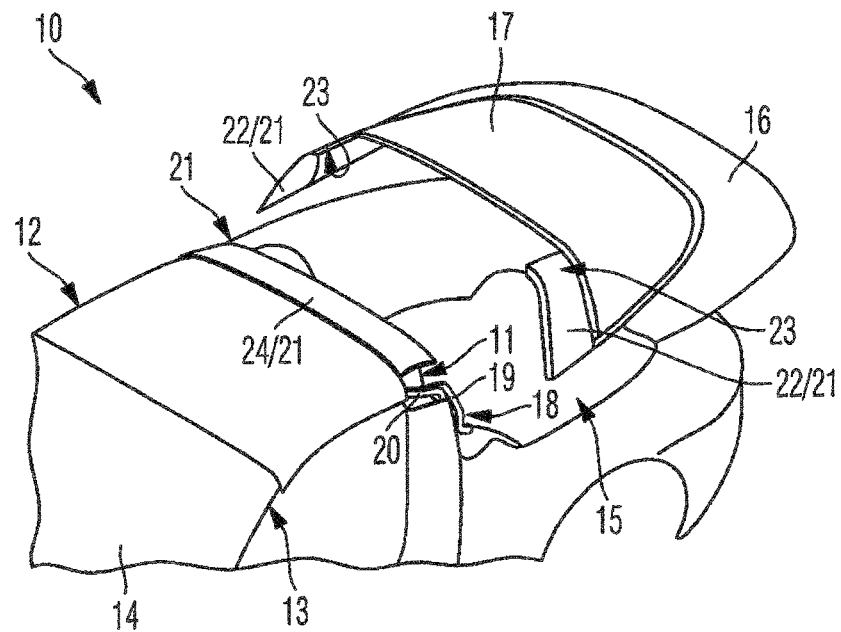
FIG. 1 is a diagrammatic, perspective view of a roof construction according to the invention of a motor vehicle according to a first exemplary embodiment of the invention.

FIG. 1 shows a first exemplary embodiment of the roof construction 10 according to the invention of the motor vehicle, wherein the roof construction 10 which is shown in FIG. 1 has a fixed roll bar 11.

Furthermore, the roof construction 10 has a roof element 12 which is shown in FIG. 1 in a closed position thereof, wherein, in the closed position, the roof element 12 is positioned between the roll bar 11 and an upper cowl 13 of a windshield 14 above non-illustrated seats of the motor vehicle.

The roof element 12 of the roof construction 10 according to the invention can be transferred from the closed position, which is shown in FIG. 1, into an open position, wherein, in the open position, the roof element 12 is positioned or put away in a convertible-top compartment 15 below the roll bar 11.

The convertible-top compartment 15 is closed by a "convertible-top compartment cover" 16 both in the closed position of the roof element 12 and in the open position thereof, wherein the convertible-top compartment cover 16 is open only during the transfer of the roof element 12 from the closed position into the open position and vice versa from the open position into the closed position. In the exemplary embodiment shown, a rear window 17 is preferably part of the convertible-top compartment cover 16.

In order to shift the roof element 12 from the open position into the closed position and vice versa from the closed position into the open position, use is made of an opening and closing mechanism 18 which is formed by links 19 and 20 and shifts the roof element 12 beyond the roll bar 11. The links 19 and 20 are coupled on one side to the roof element 12 and on the other side to a body section behind the roll bar 11, in particular to the convertible-top compartment 15.

The roll bar 11 has a substantially U-shaped contour with two lateral side struts running substantially vertically, and with a transverse strut which connects the two side struts and runs substantially horizontally. In this case, the roll bar 11 is covered on an outside by a covering 21 both in the closed position of the roof element 12 and in the open position, namely both in the region of the longitudinal struts and of the transverse strut of the roll bar 11.

In the exemplary embodiment of FIG. 1, side parts 22 of the outer covering 21 of the roll bar 11, the side parts extending substantially in the vertical direction, can be shifted completely, including curved transition sections 23 thereof to a transverse part 24 of the covering 21, relative to the roll bar 11 during the shifting of the roof element 12 from the open position into the closed position and vice versa from the closed position into the open position. Whereas the transverse part 24 of the covering 21, the transverse part 24 extending substantially in a horizontal direction and covering the transverse strut of the roll bar 11 on the outside, is fastened to the roll bar 11, namely so as not to be able to be shifted with respect thereto.

Accordingly, during the transfer of the roof element 12 from the open position into the closed position and vice versa from the closed position into the open position, the complete side parts 22 of the covering 21, including the curved transition sections 23 to the transverse part 24, are shifted relative to the roll bar 11 and therefore to the fixed transverse part 24 of the covering 21.

In the exemplary embodiment of FIG. 1, the side parts 22, including the curved transition sections 23 of the covering 21, are fastened to the convertible-top compartment cover 16 and can be shifted relative to the roll bar 11 via the convertible-top compartment cover 16 during the shifting of the roof element 12. The side parts 22, including the curved transition sections 23 thereof, are fitted or fastened to the convertible-top compartment cover 16 in such a manner that the side parts are preferably not able to be shifted relative to the convertible-top compartment cover 16.

Accordingly, in the variant embodiment of FIG. 1, the complete side parts 22 of the covering 21 are shifted relative to the roll bar 11 by the shifting of the convertible-top compartment cover 16. Accordingly, a separate drive is not required therefor; on the contrary, the drive of the convertible-top compartment cover 16 takes on the shifting of the side parts 22.

Figure 2:
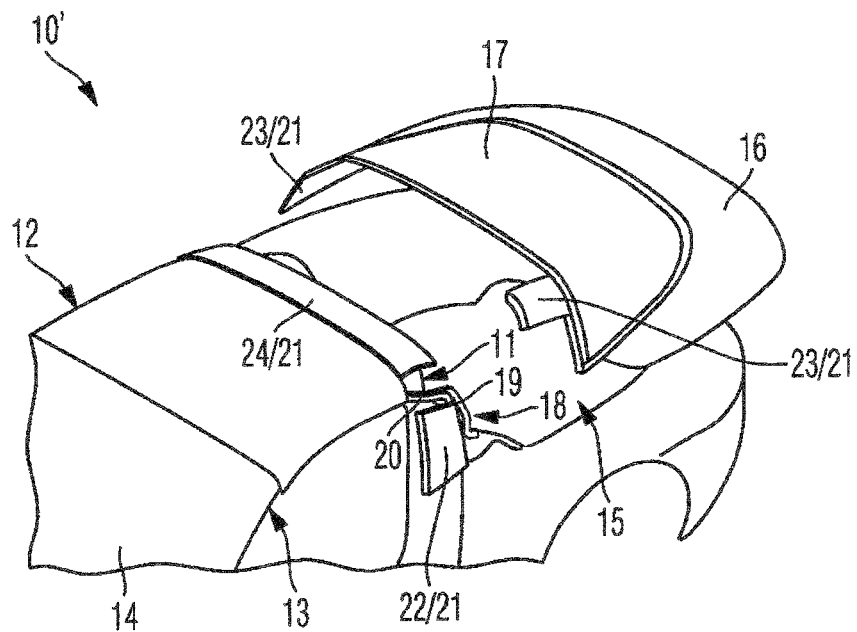
FIG. 2 is a diagrammatic, perspective view of the roof construction according to the invention of the motor vehicle according to a second exemplary embodiment of the invention.

A second exemplary embodiment of a roof construction 10' according to the invention for a motor vehicle is shown in FIG. 2, wherein, in FIG. 2, the same reference numbers as in the exemplary embodiment of FIG. 1 are used for identical subassemblies in order to avoid unnecessary repetitions.

The exemplary embodiment of FIG. 2 differs from the exemplary embodiment of FIG. 1 only in that, in the exemplary embodiment of FIG. 2, the side parts 22 of the covering 21 for the roll bar 11 cannot be shifted completely, but merely partially, relative to the roll bar 11 during the shifting of the roof element 12 from the closed position into the open position and vice versa from the open position into the closed position. In the exemplary embodiment of FIG. 2, exclusively the curved transition sections 23 of the side parts 22 of the covering 21, which transition sections provide the transition between the two side parts 22 and the transverse part 24 of the covering 21, can be shifted in relation to the roll bar 11 during the shifting of the roof element 12 from the closed position into the open position and vice versa from the open position into the closed position.

According to FIG. 2, the curved transition sections 23, in turn, are mounted on the convertible-top compartment cover 16, namely in such a manner that, although the transition sections can be shifted in relation to the roll bar 11, they cannot be shifted relative to the convertible-top compartment cover 16. The other sections of the side parts 22, and the transverse part 24 are fastened fixedly to the roll bar 11 so as not to be able to be shifted relative thereto.

Also in the variant embodiment of FIG. 2, a separate drive is not required in order to shift the transition sections 23 of the side parts 22; on the contrary, the convertible-top compartment cover 16, to which the transition sections 23 are fastened, takes over the shifting of the transition sections.

Figure 3:
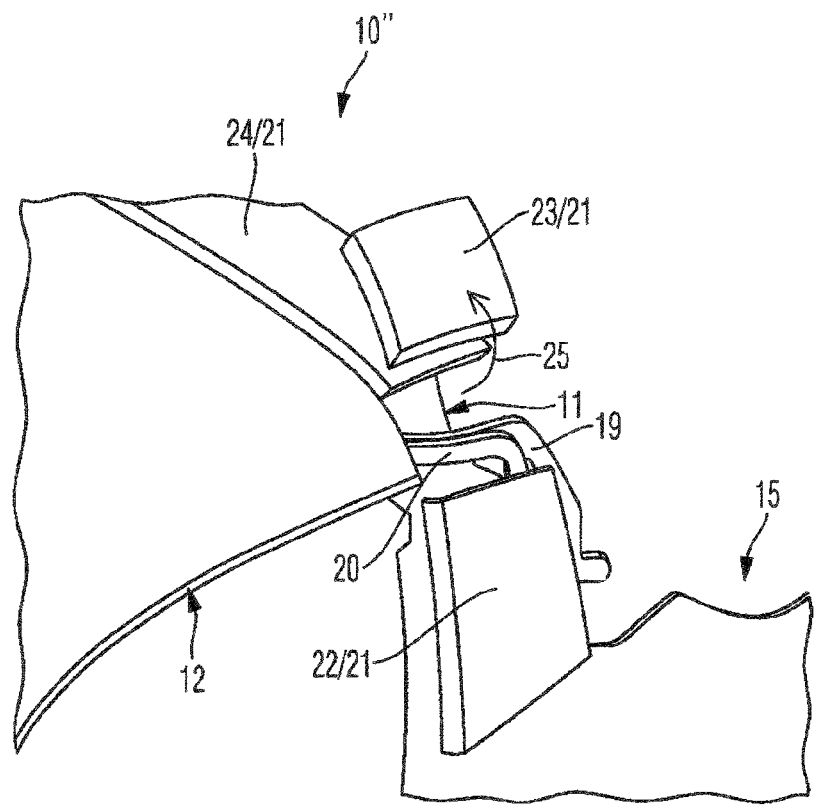
FIG. 3 is a diagrammatic, perspective view of the roof construction according to the invention of the motor vehicle according to a third exemplary embodiment of the invention.

FIG. 3 shows a further exemplary embodiment of a roof construction 10" according to the invention. In accordance with the exemplary embodiment of FIG. 2, in the exemplary embodiment of FIG. 3, only the curved transition sections 23 of the side part 22 of the covering 21 of the roll bar 11 can be shifted relative to the roll bar 11 during the shifting of the roof element 12 from the closed position into the open position and vice versa from the open position into the closed position. However, the difference over the exemplary embodiment of FIG. 2 is that, in the exemplary embodiment of FIG. 3, the transition sections 23 are not fastened to the convertible-top compartment cover 16 and cannot be shifted relative to the roll bar 11 via the convertible-top compartment cover. Rather, in the exemplary embodiment of FIG. 3, the curved transition sections 23 are fastened to the roll bar 11 and can be shifted relative thereto. The remaining sections of the side parts 22 and the transverse part 24 of the covering 21 are fastened to the roll bar 11 so as not to be able to be shifted.

FIG. 3 clarifies, by means of an arrow 25, the shifting of the curved transition sections 23, which is visible in FIG. 3, of the side part 22 of the covering 21 relative to the roll bar 11 during the transfer of the roof element 12 from the open position into the closed position and vice versa from the closed position into the open position. According to FIG. 3, the curved transition section 23 is shifted upward in the direction of the transverse part 24 of the covering 21. However, in contrast thereto, it is also possible to shift the particular transition section 23 in the opposite direction downward toward those sections of the side parts 22 of the covering 21 which are mounted fixedly on the roll bar 11.

FIGS. 4A to 5B show various kinematics, with the aid of which the shifting of the transition sections 23 relative to the roll bar 11 can be realized. The kinematics involve shifting mechanisms in order to shift the transition sections 23 of the side part 22 of the covering 21 in relation to the roll bar 11.

Figure 4A:
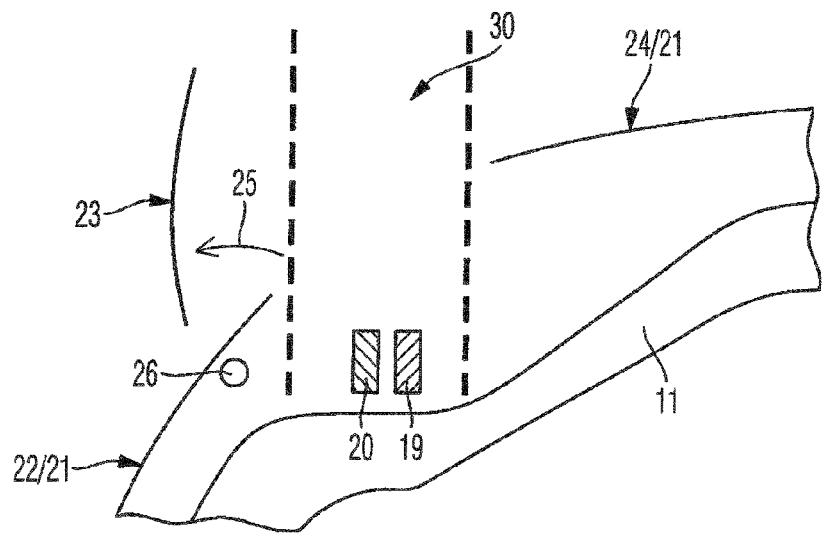
FIGS. 4A and 4B are illustrations showing a first shifting mechanism for the exemplary embodiment of FIG. 3.
Figure 4B:
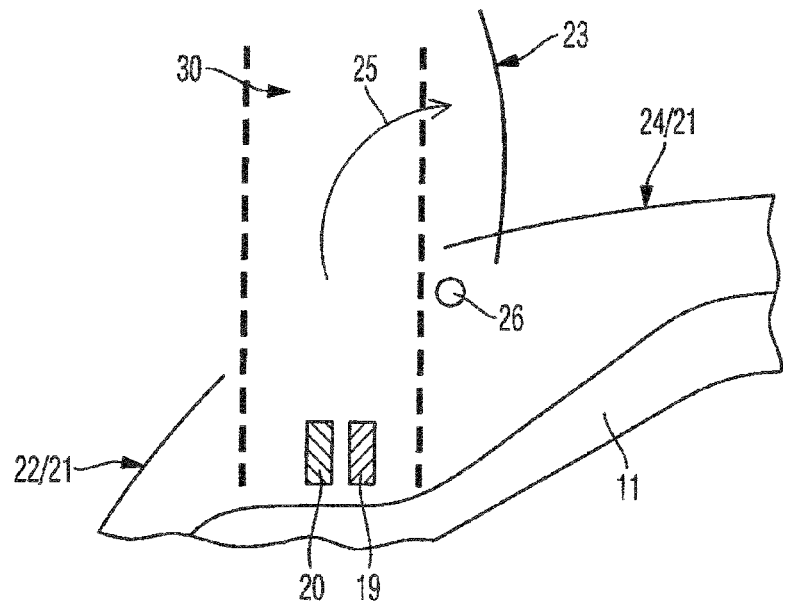

In FIGS. 4A and 4B, the curved transition section 23 shown in each case is preferably coupled to the roll bar 11 at a pivot point 26, the transition section 23 being shifted downward in FIG. 4A, and the transition section 23 being shifted upward in FIG. 4B.

Figure 5A:
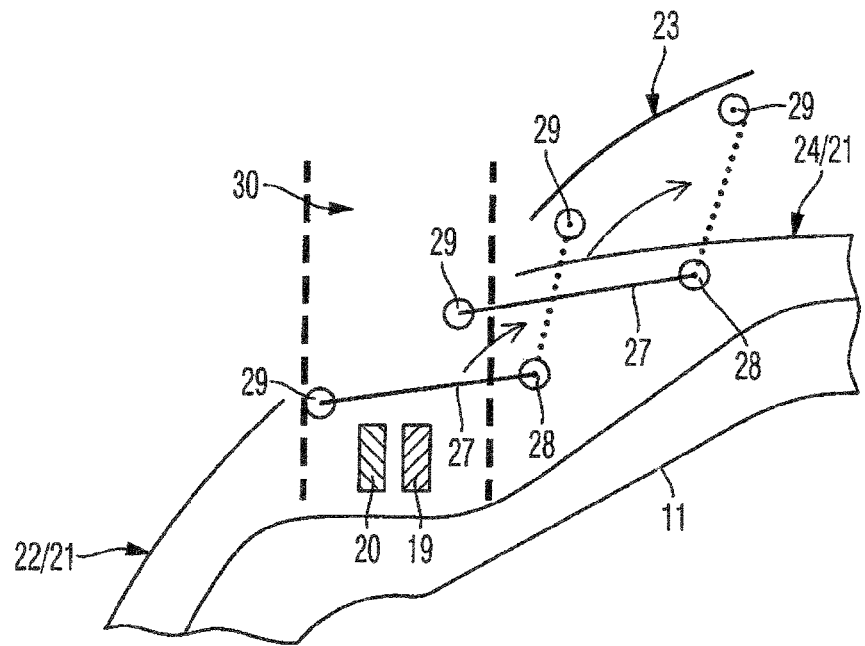
FIGS. 5A and 5B are illustrations showing a second shifting mechanism for the exemplary embodiment of FIG. 3.
Figure 5B:
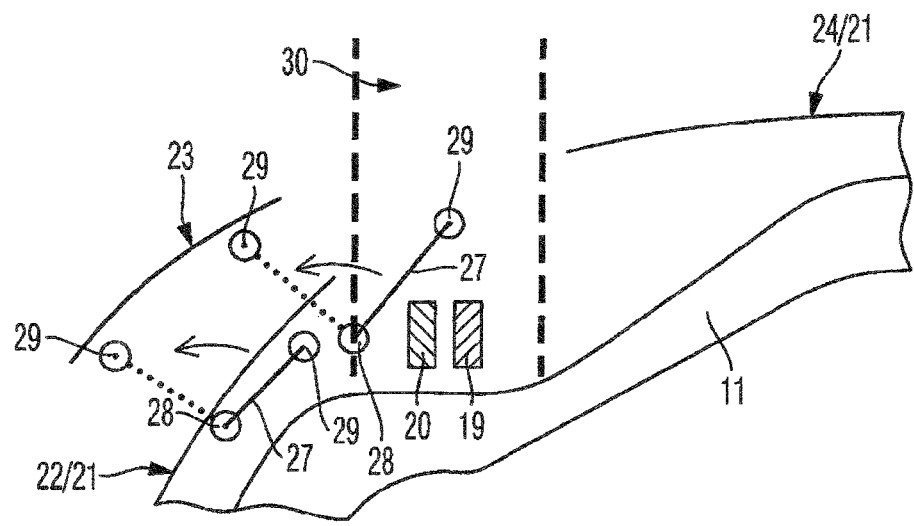

In FIGS. 5A and 5B "four-bar linkages" are formed via two links 27 in each case, wherein two positionally fixed pivot points 28 are assigned in particular to the roll bar 11 and two shiftable pivot points 29 are assigned to the links 27. The links 27 are preferably coupled to the roll bar 11 via the positionally fixed pivot points 28 and are coupled to the respective transition section 23 via shiftable pivot points 29.

Dashed lines in FIGS. 4A to 5B span regions 30 within which the links 19 and 20 of the opening and closing mechanism 18 of the roof element 12 are moved during the transfer of the roof element 12 from the closed position into the open position and vice versa from the open position into the closed position.

It can be gathered from FIGS. 4A to 5B that the transition sections 23 can be moved out of the region 30, and therefore the movement of the links 19 and 20 of the opening and closing mechanism 18 of the roof element 12 is not obstructed by the transition sections 23 during the transfer of the roof element 12 from the open position into the closed position and vice versa from the closed position into the open position.

The shifting mechanisms shown in FIGS. 4A to 5B may be assigned a separate drive in order to ensure the shifting of the respective transition section 23 relative to the roll bar 11. The drive may be configured hydraulically or electrically or in another manner.

In contrast thereto, it is also possible not to provide a separate drive for the shifting mechanism of the transition sections 23 but rather to couple the shifting mechanism of the transition sections 23 to the opening and closing mechanism 18 of the roof element 12, i.e. to the links 19 and 20. In this case, the shifting of the curved transition sections 23 is then taken over by the drive of the opening and closing mechanism of the roof part or roof element 12.

A common feature of all of the exemplary embodiments shown is that side parts 22 of the covering 21 of the roll bar 11, the side parts extending substantially in the vertical direction, can be at least partially shifted relative to the roll bar 11 during the shifting of the roof element 12 from the open position into the closed position and vice versa from the closed position into the open position, wherein the transverse part 24 of the covering 11, which transverse part extends substantially in the horizontal direction, is fastened to the roll bar 11 and cannot be shifted relative thereto.

The invention claimed is:

1. A roof construction of a motor vehicle having an upper cowl of a windshield and a convertible-top compartment, the roof construction comprising:
a fixed roll bar;
an opening and closing mechanism;
a roof element which, in a closed position, is accommodated in front of said fixed roll bar, namely between said fixed roll bar and the upper cowl of the windshield, and, in an open position, is accommodated behind said fixed roll bar in the convertible-top compartment and which can be shifted from the open position into the closed position and vice versa from the closed position into the open position beyond said fixed roll bar via said opening and closing mechanism; and
a covering having a transverse part and side parts for covering said fixed roll bar on an outside in the open position of said roof element and in the closed position of said roof element, said side parts of said covering extending substantially in a vertical direction, can be shifted at least partially, or at least in sections, relative to said fixed roll bar during a shifting of said roof element from the open position into the closed position and vice versa from the closed position into the open position, said transverse part of said covering extending generally in a horizontal direction, being fastened to said fixed roll bar so as not to be able to be shifted relative thereto,
wherein said side parts of said covering include curved transition sections and can be shifted completely to said transverse part of said covering, and relative to said fixed roll bar during the shifting of said roof element from the open position into the closed position and vice versa from the closed position into the open position, and wherein only said curved transition sections of said side parts of said covering can be shifted to said transverse part and relative to said fixed roll bar during the shifting of said roof element from the open position into the closed position and vice versa from the closed position into the open position.

2. The roof construction according to claim 1, wherein said side parts, including said curved transition sections, are fastened to a convertible-top compartment cover of the convertible-top compartment and can be shifted relative to said fixed roll bar via said convertible-top compartment cover during the shifting of said roof element.

3. The roof construction according to claim 2, wherein said side parts, including said curved transition sections, are fastened to the convertible-top compartment cover so as not to be able to be shifted relative thereto.

4. The roof construction according to claim 1, wherein only said curved transition sections are fastened to a convertible-top compartment cover of the convertible-top compartment and can be shifted relative to said roll bar via the convertible-top compartment cover during the shifting of said roof element.

5. The roof construction according to claim 4, wherein only said curved transition sections are fastened to the convertible-top compartment cover so as not to be able to be shifted relative thereto, whereas remaining sections of said side parts of said covering together with said transverse part of said covering are fastened to said fixed roll bar so as not to be able to be shifted relative thereto.

6. The roof construction according to claim 1, wherein said curved transition sections are fastened to said fixed roll bar so as to be able to be shifted relative thereto, whereas remaining sections of said side parts of said covering together with said transverse part of said covering are fastened to said fixed roll bar so as not to be able to be shifted relative thereto.

7. The roof construction according to claim 6, further comprising a shifting mechanism, said curved transition sections are coupled to said fixed roll bar via said shifting mechanism and can be shifted relative to said fixed roll bar.

8. The roof construction according to claim 7, wherein:
said opening and closing mechanism has a drive; and
said shifting mechanism for said curved transition sections is coupled to said opening and closing mechanism of said roof element and can be actuated via said drive of said opening and closing mechanism.

9. The roof construction according to claim 7, wherein said shifting mechanism for said curved transition sections is assigned a separate drive for actuating said shifting mechanism.

* * * * *